United States Patent
Tsai et al.

(10) Patent No.: US 8,451,386 B2
(45) Date of Patent: May 28, 2013

(54) DIGITAL INTERMEDIATE FREQUENCY DEMODULATOR

(75) Inventors: Tien-Ju Tsai, Tainan County (TW); Pei-Jun Shih, Tainan County (TW)

(73) Assignee: Himax Media Solutions, Inc., Sinshih Township, Tainan County (TW)

( * ) Notice: Subject to any disclaimer, the term of this patent is extended or adjusted under 35 U.S.C. 154(b) by 1024 days.

(21) Appl. No.: 12/479,912

(22) Filed: Jun. 8, 2009

(65) Prior Publication Data

US 2010/0309385 A1 Dec. 9, 2010

(51) Int. Cl.
*H04N 5/44* (2011.01)
*H04N 5/455* (2006.01)

(52) U.S. Cl.
USPC .......................................... 348/725; 348/726

(58) Field of Classification Search
None
See application file for complete search history.

(56) References Cited

U.S. PATENT DOCUMENTS

| 6,233,295 | B1 * | 5/2001 | Wang | 375/364 |
| 2007/0205940 | A1 * | 9/2007 | Yang et al. | 342/357.12 |
| 2009/0129450 | A1 * | 5/2009 | Eum et al. | 375/214 |

* cited by examiner

*Primary Examiner* — Nasser Goodarzi
*Assistant Examiner* — Mary A Kay
(74) *Attorney, Agent, or Firm* — McClure, Qualey & Rodack, LLP

(57) ABSTRACT

The invention discloses a digital IF demodulator for processing a digital IF signal converted from a radio frequency (RF) signal, including an NCO, a down conversion circuit, a PIF carrier recovery circuit and a video baseband demodulator. The NCO outputs a sine value and a cosine value. The down conversion circuit outputs a first zero IF signal including a first real part signal and a first imaginary part signal, according to the digital IF signal, the sine value and the cosine value. The PIF carrier recovery circuit outputs a loop error signal for the NCO and a second zero IF signal, according to the first zero IF signal and a video synchronization signal. The video baseband demodulator generates a composite video signal according to the second zero IF signal.

11 Claims, 10 Drawing Sheets

DIGITAL INTERMEDIATE FREQUENCY DEMODULATOR

BACKGROUND OF THE INVENTION

1. Field of the Invention

The invention relates generally to a digital intermediate frequency (IF) demodulator, and more particularly, to a digital IF demodulator that enhances the synchronization ability for TV systems.

2. Description of the Related Art

For traditional analog TV broadcast systems such as the National Television System Committee (NTSC), the Phase Alternating Line (PAL) and the Sequential Couleur Avec Mémoire (SECAM) systems, a baseband video and audio signal is modulated as an intermediate frequency signal based on corresponding modulation technologies specified for individual TV systems. The modulated IF signal is then frequency up-converted to a Radio Frequency (RF) signal via filtering, frequency up converting and signal amplifying. The produced RF signal is further transmitted through the atmosphere or by a coaxial transmission line. Using the NTSC system as an example, the baseband video signal is first sent to a Low Pass Filter (LPF) with the bandwidth of 4.2 MHz, and then output from the LPF with an output signal modulated as an IF carrier with frequency of 45.75 MHz in an Amplitude Modulation (AM) manner. Alternatively, the baseband audio signal may first be encoded using a Multi Channel Television Sound (MTS) mechanism and then sent to an LPF with the bandwidth of 200 KHz. Next, the output signal of the LPF is then modulated as an IF carrier with frequency of 41.25 MHz in a Frequency Modulation (FM) manner. Following, the video IF carrier is then mixed with the audio IF carrier, and the mixed signal is sent to a Band Pass Filter (BPF) having a 6.0 MHz bandwidth and 44 MHz central frequency. Finally, the BPF output signal is frequency up-converted and amplified as an RF frequency signal, and is then transmitted via an antenna or a coaxial transmission line.

At the receiving end, the received RF signal is typically coupled to a device, such as a tuner, in order to demodulate the received wideband RF signal with a specific RF frequency, such that the video and audio signals contained within a signal having a bandwidth of around 6 MHz carried by the RF frequency can be reconstructed. Most tuners are implemented by a superheterodyne architecture. For the receiving end, an IF demodulator is essential and traditionally implemented by an analog integrated circuit along with appropriate RLC (resistor/inductor/capacitor) elements. However, with advancement of System-On-Chip (SOC) technology, comprehensive and digital IF demodulators may be provided. SOC IF modulators have advantages such as lower cost and higher yield rates, and also reduce the effect of temperature/humidity variations, among other advantages, thus resulting in more stable IF modulator circuit performance.

IF demodulation generally comprises the steps of receiving an IF bandpass signal with a specific frequency, synchronizing and reconstructing the carrier signal from the IF bandpass signal, demodulating the signal modulated at the transmitting end, filtering the demodulated signal and separating the video and audio signals from the filtered signal, such that the baseband video and audio signals carried therein may be reconstructed. Among the steps, synchronization of the carrier signal is particularly important. This is because the quality of the reconstructed video and audio signals might be impacted if the carrier synchronization is not efficiently obtained, or a severe jitter is involved in the reconstructed carrier.

Apart from interference resulting from white noise, the Co-Channel Interference (CCI) resulting from multi paths as well as the Adjacent-Channel Interference (ACI) and the inter-modulation interference resulting from channel nonlinearity, are also common interferences found in analogy TV systems. In addition, in analogy TV systems, the carrier signal is transmitted in an in-band signaling manner. In this regard, apart from the interferences describe above, signals near the carrier signal (i.e. the luminance information of video signals) also affect the synchronization stability of the carrier signals. In addition, in some countries or systems, the frequency of the transmitted radio signal is adjusted in order to avoid frequency bands where interferences often occur. However, the adjustment results in a significant frequency shift for the receiving end IF frequency. If the carrier reconstruction mechanism of the IF demodulation system is not able to sufficiently adjust for high frequency shifts, reconstruction of appropriate video and audio signals will not be possible.

BRIEF SUMMARY OF THE INVENTION

The invention discloses a digital IF demodulator for processing a digital IF signal converted from a radio frequency (RF) signal, comprising an NCO, a down conversion circuit, a PIF carrier recovery circuit and a video baseband demodulator. The NCO outputs a sine value and a cosine value. The down conversion circuit outputs a first zero IF signal comprising a first real part signal and a first imaginary part signal, according to the digital IF signal, the sine value and the cosine value. The PIF carrier recovery circuit outputs a loop error signal for the NCO and a second zero IF signal, according to the first zero IF signal and a video synchronization signal. The video baseband demodulator generates a composite video signal according to the second zero IF signal.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
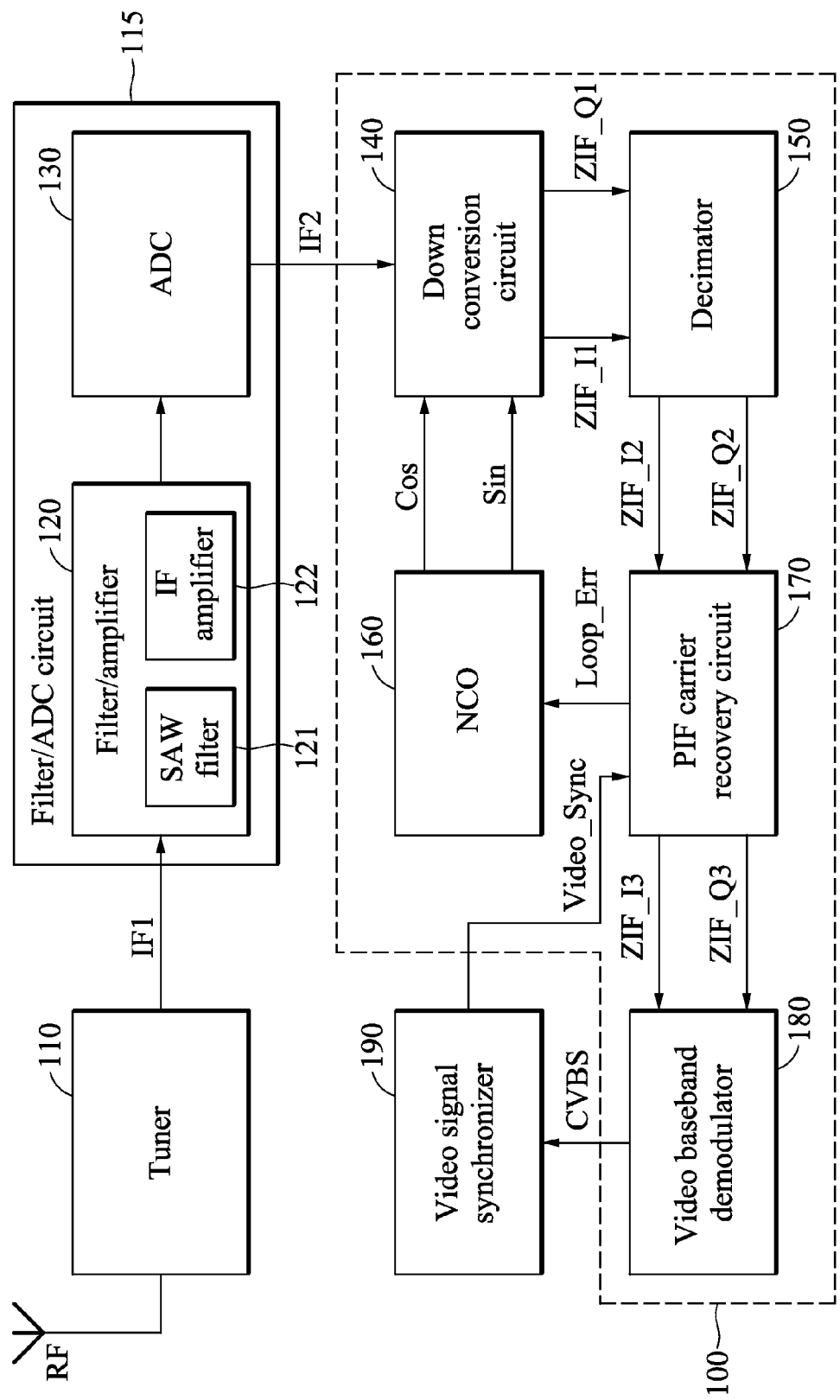
FIG. 1 shows a block diagram of a digital IF demodulator for analog TV systems according to an embodiment of the invention.

FIG. 1 shows a block diagram of a digital IF demodulator 100 for analog TV systems according to an embodiment of the invention. The analog TV systems comprises a tuner 110, a filter/ADC circuit 115, a digital IF demodulator 100 and a video signal synchronizer 190. The digital IF demodulator 100 comprises a down conversion circuit 140, a decimator 150, a Numerically Controlled Oscillator (NCO) 160, a picture intermediate frequency (PIF) carrier recovery circuit 170 and a video baseband demodulator 180. The filter/ADC circuit 115 comprises a filter/amplifier 120 and an analog to digital converter (ADC) 130. The filter/amplifier 120 comprises a SAW filter 121 and an IF amplifier 122. In FIG. 1, a radio signal RF is received by the tuner 110. The tuner 110 is responsible for converting the received radio signal RF into an analog IF signal IF1. The analog IF signal IF1 is then converted by the filter/ADC circuit to generate a digitalized IF signal IF2. As described previously, the filter/amplifier 120 comprises the SAW filter 121 and the IF amplifier 122. The SAW filter 121 is a high Q filter (e.g., with an insertion loss of around 20~30 dB), which means that the SAW filter 121 may significantly attenuate the input signal IF1. In this regard, the SAW filter 121 outputs an attenuated analog IF signal (not shown) upon reception of the analog IF signal IF 1, wherein the attenuated analog IF signal is significantly attenuated from the received analog IF signal IF1 due to its insertion loss. In light of the loss, the IF amplifier 122 is used to make up for the drawback of the SAW filter, amplifying the attenuated analog IF signal back to a desired scale. The amplified analog IF signal with a proper signal swing is then sent to the ADC 130. Upon reception of the amplified analog IF signal from the IF amplifier 122, the ADC 130 converts the amplified analog IF signal into the digitalized IF signal IF2 using a digital sampling rate of Fsi. The digitalized IF signal IF2 is then processed by the down conversion circuit 140, as illustrated below.

Figure 2:
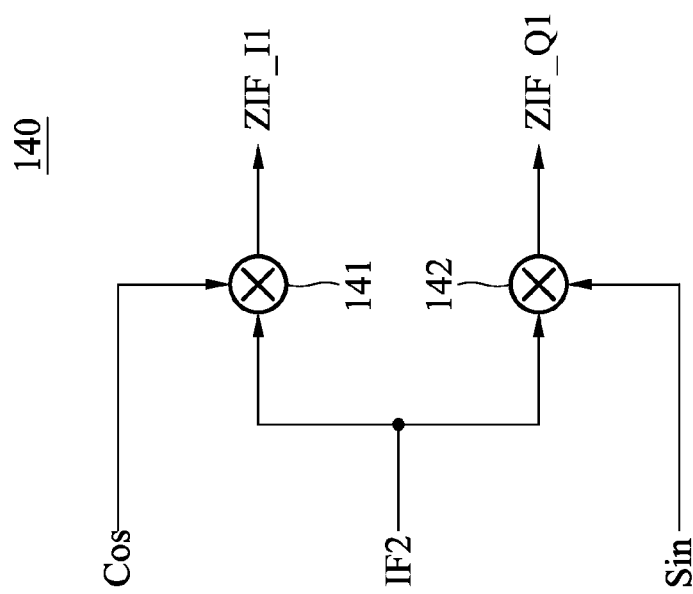
FIG. 2 shows a circuit diagram of a down conversion circuit according to an embodiment of the invention.

FIG. 2 shows a circuit diagram of a down conversion circuit 140 according to an embodiment of the invention. The down conversion circuit 140 is used to shift the frequency of the digitalized IF signal IF2 to a lower frequency, such as a zero intermediate frequency (zero IF), in order to generate a zero IF signal. For example, the sampling rate Fsi of the ADC 130 may be 49.152 MHz and the frequency of the analog IF signal IF1 may be 45.75 MHz for an NTSC system. In this case, the down conversion circuit 140 may shift the digitalized IF signal IF2 to an IF frequency of 3.402 MHz. Referring to FIG. 2, the digitalized IF signal IF2 is received and multiplied by a cosine signal Cos and a sine signal Sin to generate the zero IF signal. The zero IF signal is a complex signal which comprises a real part signal ZIF_I1 and an imaginary part signal ZIF_Q1. The cosine and sine signals have a frequency which is the same as the carrier frequency of the digitalized IF signal IF2. In addition, the real part signal ZIF_I1 is obtained by the formula: ZIF_I1=IF2*Cos, which is accomplished by a multiplier 141. Also, the imaginary part signal ZIF_Q1 is obtained by the formula: ZIF_Q1=IF2*Sin, which is accomplished by another multiplier 142. Based on the previous, using an NTSC system as an example, the complex zero IF signal is generated by the down conversion circuit 140. Note the central frequency of 3.402 MHz is merely an example for an NTSC system, and should not be taken as to be limited thereto. Since the down conversion circuit 140 shifts the frequency of the digitalized IF signal IF2 to baseband (zero IF), the sampling rate corresponding thereto may also be reduced. The reduction of the sampling rate is performed by the decimator 150, as described below.

Figure 3:
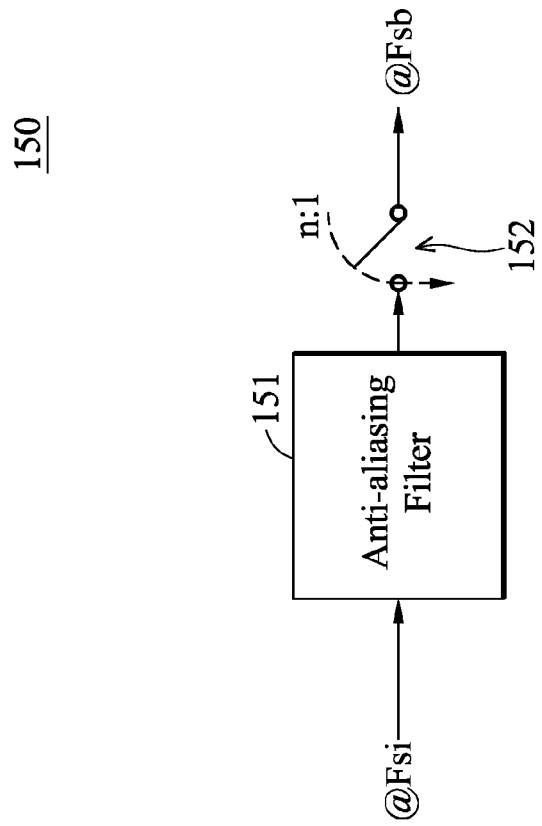
FIG. 3 shows a circuit diagram of a decimator according to an embodiment of the invention.

FIG. 3 shows a circuit diagram of a decimator 150 according to an embodiment of the invention. In FIG. 3, the sampling rate Fsi used in the ADC 130 is received by an anti-aliasing filter 151. Since the analog IF signal IF1 received by the ADC 130 is a high-frequency signal, the corresponding sampling rate is assumed to be high enough. However, with frequency reduction performed on the digitalized IF signal IF2 by the down conversion circuit 140, the corresponding sampling rate may be lower for cost considerations. As shown in FIG. 3, a switch 152 may be designed as a sampling rate of n:1. If n is 10, the outputted sampling rate Fsb will be 10 times lower than the input sampling rate Fsi. Note n is an integer and is adjustable according to requirements. Thus, the decimator 150 receives the complex zero IF signal ZIF_µl and ZIF_Q1, and outputs another complex zero IF signal also comprising a real part signal ZIF_I2 and an imaginary part signal ZIF_Q2, with a decreased sampling rate Fsb. The zero IF signal ZIF_I2 and ZIF_Q2 is then sent to the PIF carrier recovery circuit 170 to further generate a loop error signal Loop_Err as a feedback signal of the NCO 160, as well as another zero IF signal which is directed to the video baseband demodulator 180. It is worthy of noting that the decimator 150 may be omitted in the digital IF demodulator, and thus the zero IF signal ZIF_I1 and ZIF_Q1 is directly sent to the PIF carrier recovery circuit 170. The described process will be introduced later in the specification.

Figure 4:
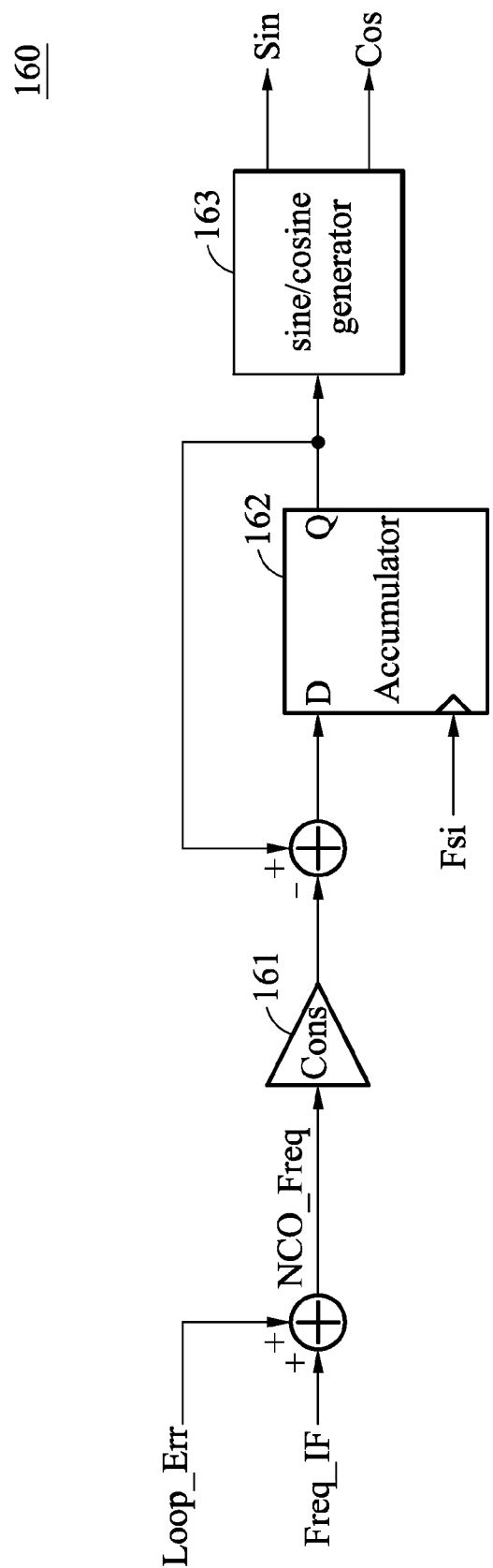
FIG. 4 shows a block diagram of an NCO according to an embodiment of the invention.

FIG. 4 shows a block diagram of an NCO 160 according to an embodiment of the invention. The NCO 160 comprises a constant amplifier 161, an accumulator 162 and a sine/cosine generator 163 implementing a Coordinate Rotation Digital Computer (CORDIC) iteration algorithm or other suitable algorithm. In FIG. 4, the loop error signal Loop_Err generated by the PIF carrier recovery circuit 170 is added to a signal Freq_IF to generate a signal NCO_Freq. The signal NCO_Freq is further amplified by the constant amplifier 161 and sent to the accumulator 162. The accumulator 162 receives the digital sampling rate Fsi as its clock signal, and the output of the accumulator 162 is added back to the output of the constant amplifier 161 to form an adjusted input for itself. Furthermore, the output of the accumulator 162 is also sent to the sine/cosine generator 163 to generate the final sine/cosine signals Sin/Cos for the down conversion circuit 140, as previously indicated in FIG. 2. Note the loop error signal Loop_Err initially is inexistent due to an open loop situation. In this regard, the signal Freq_IF is output as the signal NCO_Freq. The signal Freq_IF is a frequency signal having the same frequency as the video carrier frequency carried within the digitalized IF signal IF2, which varies with different TV systems and is 3.402 MHz for an NTSC system, for example. Therefore, once the TV system is determined, the signal Freq_IF is also determined. In other words, the signal Freq_IF is a fixed constant frequency for a given TV system. On the other hand, as stated above, the loop error signal Loop_Err is initially zero for an open loop situation. Thus, if the sine/cosine signals Sin/Cos are generated, the loop error signal Loop_Err would be present. As a result, the signal NCO_Freq is timely adjusted to generate the proper output sine/cosine signals Sin/Cos. The sine signal Sin may be generated according to the formula: $Sin(n)=sin(2*pi*NCO\_Freq*m/Fsi)$. Also, the cosine signal Cos may be generated according to the formula: $Cos(n)=cos(2*pi*NCO\_Freq*m*/Fsi)$. Note m is an integer and is adjustable according to requirements. The generation of the loop error signal Loop_Err is explained in FIG. 5 below.

Figure 5:
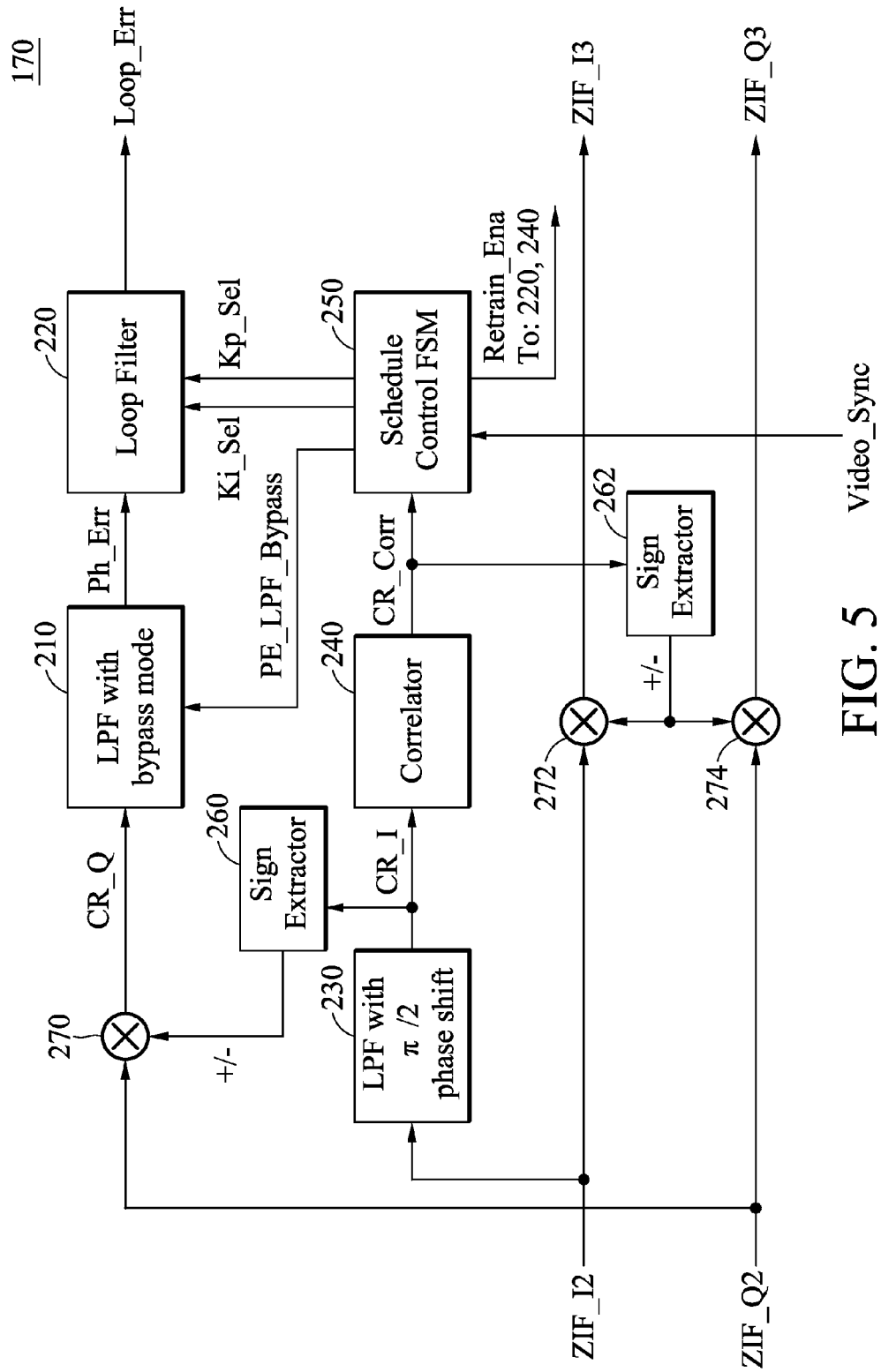
FIG. 5 shows a circuit diagram of a PIF carrier recovery circuit according to an embodiment of the invention.

FIG. 5 shows a circuit diagram of a PIF carrier recovery circuit 170 according to an embodiment of the invention. The PIF carrier recovery circuit 170 comprises an LPF 210 with bypass mode, a loop filter 220, an LPF 230 with π/2 phase shift, a correlator 240, a schedule control Finite State Machine (FSM) 250 (schedule control logic), two sign extractors 260 and 262 and three multipliers 270, 272 and 274. First, the LPF 230 shifts the real part of the received zero IF signal ZIF_I2 by π/2 radians to output a phase shifted signal CR_I. The phase shifted signal CR_I is sent to the sign extractor 260 for sign information extraction. The extracted sign information is multiplied by the received imaginary part of the received zero IF signal ZIF_Q2 to generate a multiplied signal CR_Q, wherein the multiplication is accomplished by the multiplier 270. The multiplied signal CR_Q is sent to the LPF 210 to generate a phase error Ph_Err, and then along with two indices Kp_Sel and Ki_Sel outputted by the schedule control Finite State Machine 250, the phase error Ph_Err is sent to the loop filter 220 to generate the loop error signal Loop_Err for the NCO 160. The LPF 210 may either be a low pass filter or an all pass filter, which is determined according to a flag PE_LPF_Bypass output by the schedule control FSM 250. In addition, the phase shifted signal CR_I is also sent to the correlator 240. Upon reception of the phase shifted signal CR_I, the correlator 240 outputs a correlation signal CR_Corr. The correlation signal CR_Corr is sent to the sign extractor 262 for sign information extraction. The extracted sign information is multiplied by the signals ZIF_I2 and ZIF_Q2 to generate a zero IF signal comprising a real part signal ZIF_I3 and an imaginary part signal ZIF_Q3 directed to the video baseband demodulator 180. The real part signal ZIF_I3 is generated by multiplying the real part signal ZIF_I2 by the extracted sign portion of the correlation signal CR_Corr, which is done via the multiplier 272. Similarly, the imaginary part signal ZIF_Q3 is generated by multiplying the imaginary part signal ZIF_Q2 by the extracted sign portion of the correlation signal CR_Corr, which is done via another multiplier 274. In addition, the correlation signal CR_Corr along with the video synchronization signal Video_Sync generated by the video signal synchronizer 190 is also sent to the schedule control FSM 250 to determine a flag CR_Locked indicating a signal convergence condition (the state of the flag is either TRUE or FALSE). With the determined signal convergence condition, the schedule control FSM 250 adjusts two indices Kp_Sel and Ki_Sel directed to the loop filter 220. Once the two indices are appropriately adjusted, the flag PE_LPF_Bypass is set as FALSE, making the LPF 210 operate in the low pass mode. In addition, the schedule control FSM 250 also outputs a flag Retrain_Ena for determining whether the loop filter 220 and the correlator 240 should be re-started. The operational details of the schedule control FSM 250 are illustrated later in the specification. Note in FIG. 5, the multiplication is not necessarily accomplished by a multiplier (such as the multiplier 270, 272 or 274). The multiplier is only one way of achieving the multiplication, any components or the combination thereof capable of achieving the multiplication may be used, such as selector, inverter etc.

As described above, the zero IF signal comprising signals ZIF_I3 and ZIF_Q3 is sent to the video baseband demodulator 180. Based on the sent zero IF signal, the video baseband demodulator 180 generates a composite video signal (CVBS). Not that the generation process normally comprises steps of Nyquist Shaping, low pass filtering and group delay equalizing. The generated composite video signal is further sent to the video signal synchronizer 190 (or a video decoder) to generate a video synchronization signal Video_Sync, which is directed back to the schedule control FSM 250. It is worthy of noting that the video synchronization signal is generated (TRUE or FALSE), when the synchronization of the composite video signal is confirmed. For example, when the horizontal synchronization of the composite video signal is confirmed, the video signal synchronizer 190 generates the video synchronization signal as TRUE. In addition, the video signal synchronizer 190 may be embedded in the digital IF demodulator 100.

Figure 6:
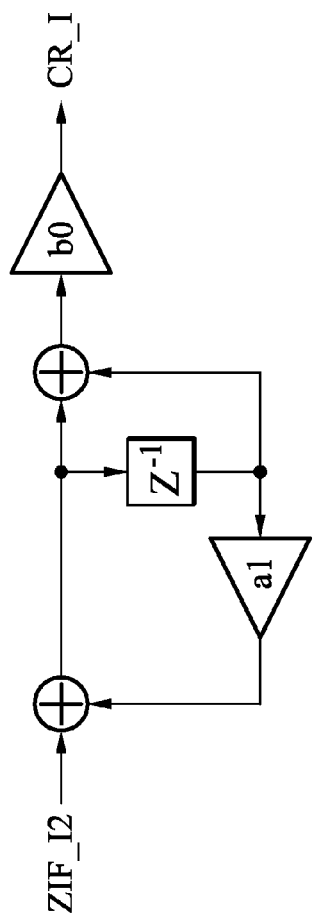
FIG. 6 shows a circuit diagram of an LPF with $\pi/2$ phase shift according to an embodiment of the invention.

FIG. 6 shows a circuit diagram of an LPF 230 with π/2 phase shift according to an embodiment of the invention. In FIG. 6, the real part signal ZIF_I2 is low-pass filtering by a LPF 230 with π/2 phase shift to output the phase shifted signal CR_I, and both a1 and b0 are constants.

Figure 7:
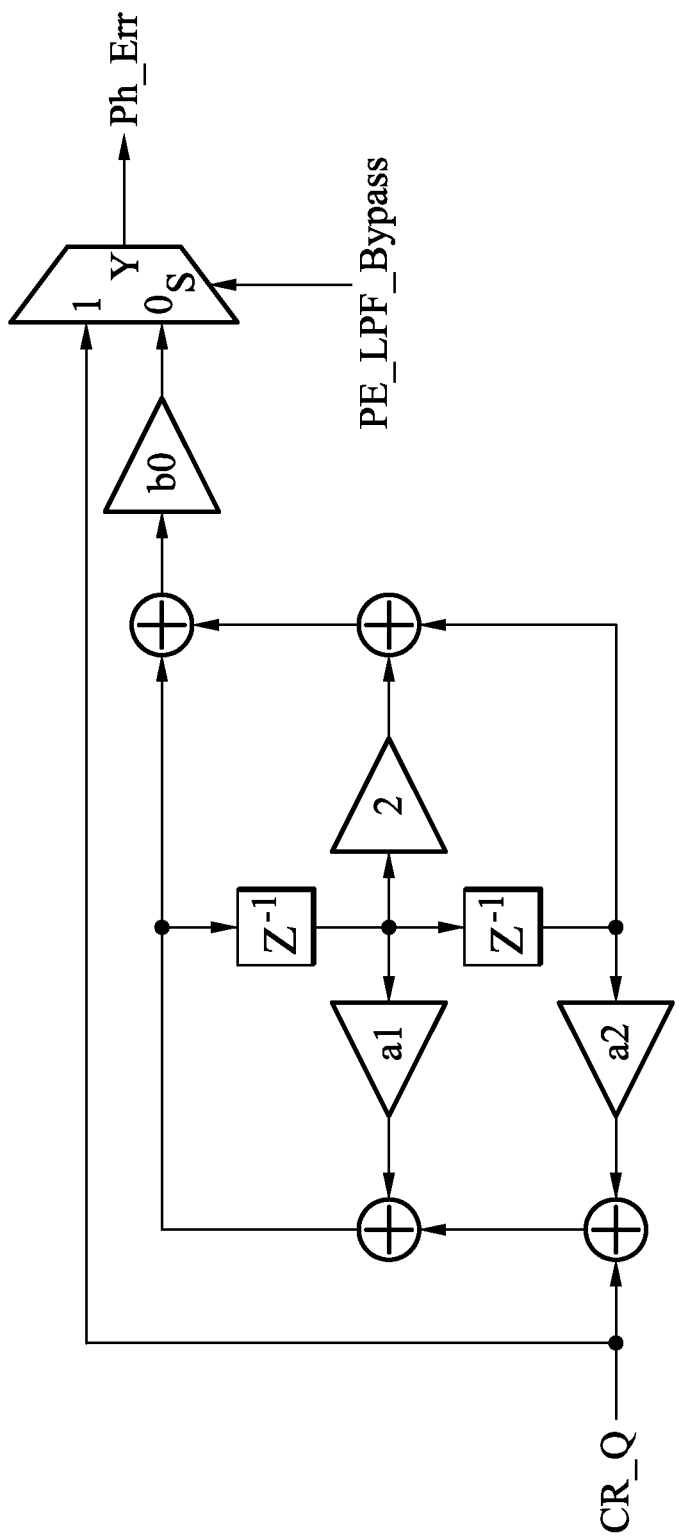
FIG. 7 shows a circuit diagram of an LPF with bypass mode according to an embodiment of the invention.

FIG. 7 shows a circuit diagram of an LPF 210 with bypass mode according to an embodiment of the invention. In FIG. 7, the output signal (the phase error Ph_Err) is selected as the multiplied signal CR_Q or the low-pass filtered multiplied signal CR_Q according to the flag PE_LPF_Bypass outputted by the schedule control FSM 250, and a1, a2 and b0 are all constants.

Figure 8:
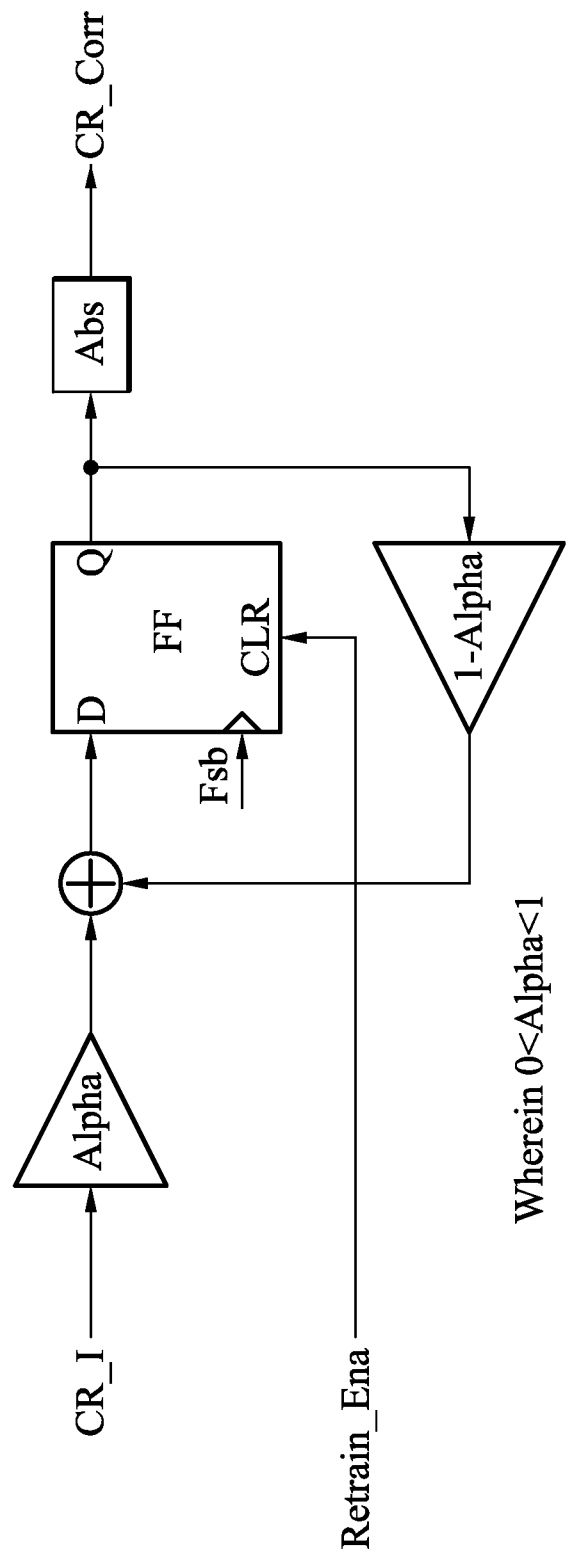
FIG. 8 shows a circuit diagram of a correlator according to an embodiment of the invention.

FIG. 8 shows a circuit diagram of a correlator 240 according to an embodiment of the invention. In FIG. 8, the phase shifted signal CR_I is processed to generate the correlation signal CR_Corr. The Alpha is between 0 and 1, and the symbol Abs represents the operation of the absolute value. As indicated above, the flag Retrain_Ena determines whether the correlator 240 is to be restarted.

Figure 9:
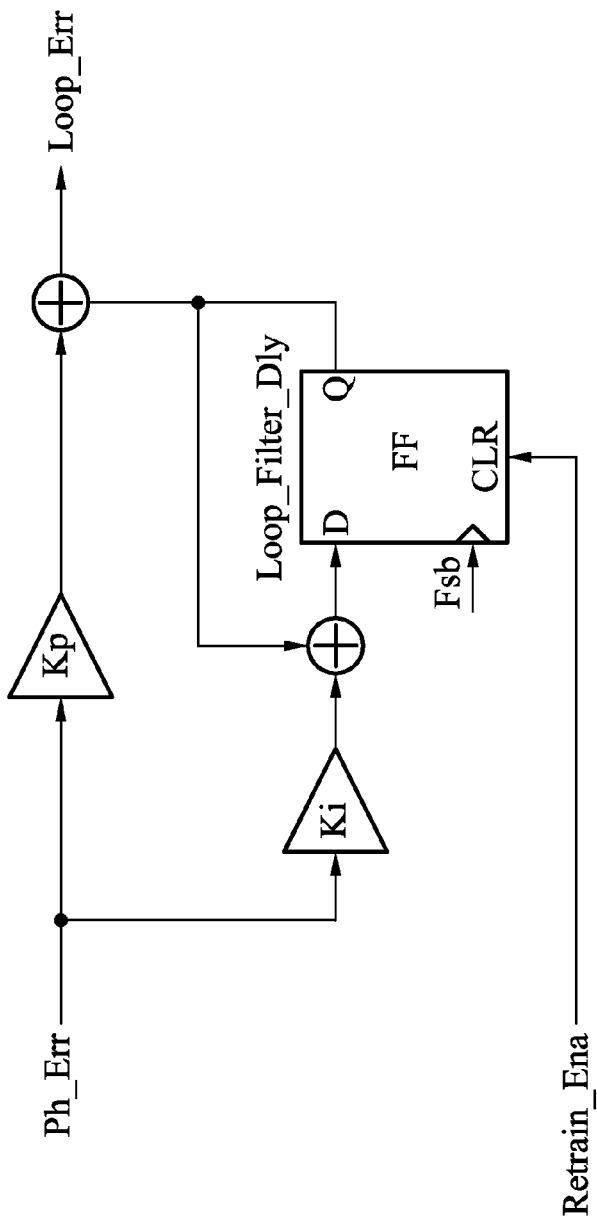
FIG. 9 shows a circuit diagram of a loop filter according to an embodiment of the invention.

FIG. 9 shows a circuit diagram of a loop filter 220 according to an embodiment of the invention. In FIG. 9, the phase error Ph_Err is processed to generate the loop error signal Loop_Err. The Kp and Ki are used to control the loop bandwidth (gain setting). Note that if a phase is not locked in (not converged), a larger loop bandwidth is required, and vice versa. In addition, the values of the Kp and Ki are determined from a look-up-table using the indices Kp_Sel and Ki_Sel adjustable by the schedule control FSM 250. The flag Retrain_Ena determines whether the loop filter 220 is to be restarted.

Figure 10:
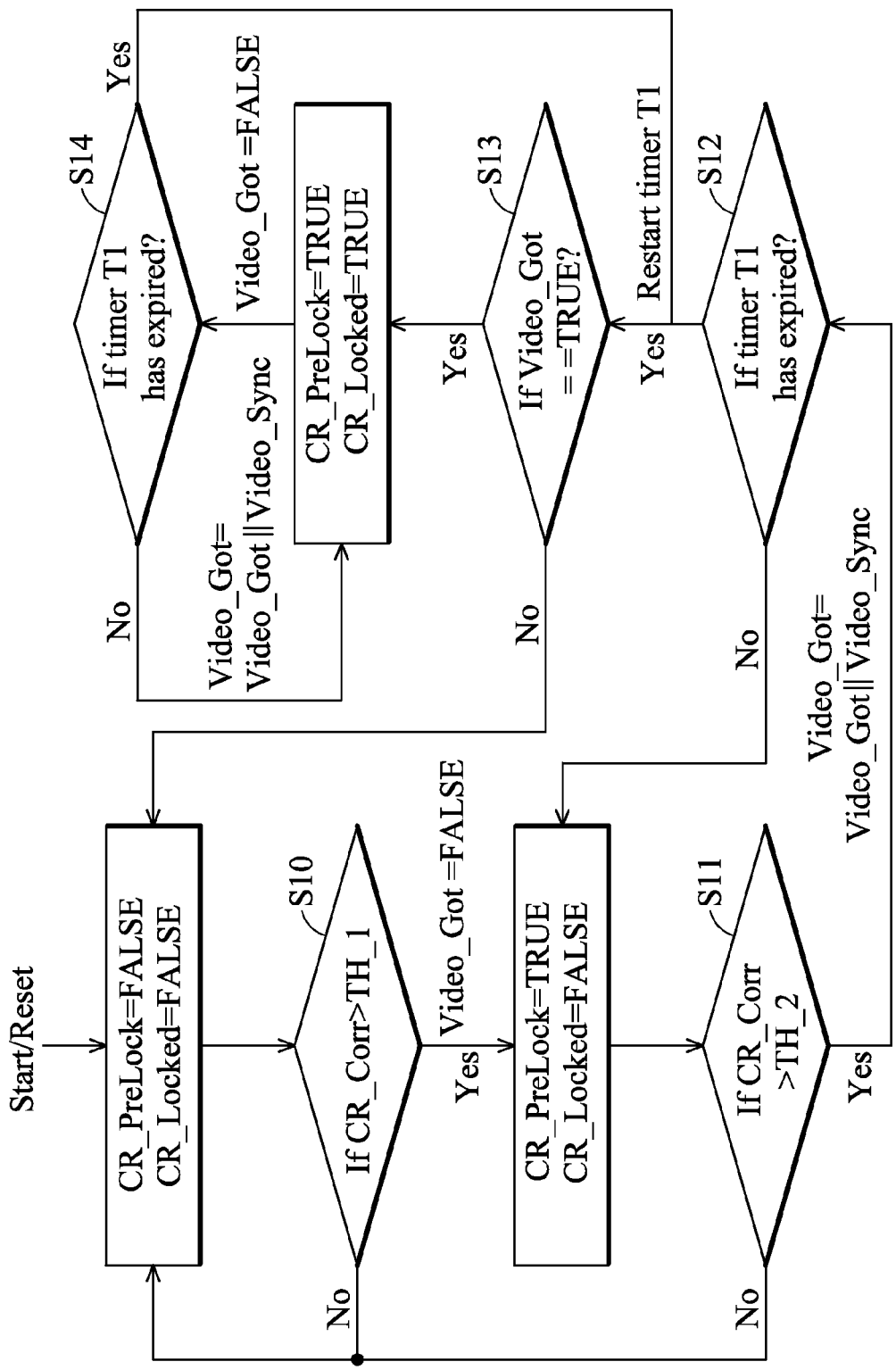
FIG. 10 shows an operation flowchart of a schedule control FSM according to an embodiment of the invention.

FIG. 10 shows an operation flowchart of a schedule control FSM according to an embodiment of the invention. In FIG. 10, three states are present: (1) CR_PreLock=FALSE/CR_Locked=FALSE, (2) CR_PreLock=TRUE/CR_Locked=FALSE, and (3) CR_PreLock=TRUE/CR_Locked=TRUE. At the beginning, the system starts with the "CR_PreLock=FALSE/CR_Locked=FALSE" state, meaning that the phase is neither approximately locked nor precisely locked. Next, it is determined whether the correlation signal CR_Corr is higher than a first threshold TH_1 (step S10). If not, the procedure goes back to the initial state "CR_PreLock=FALSE/CR_Locked=FALSE". If so, a flag Video_Got is set as FALSE and the schedule control FSM 250 proceeds to the second state "CR_PreLock=TRUE/CR_Locked=FALSE". The flag Video_Got set as FALSE represents that the phase has yet to be precisely locked. Meanwhile, when entering the second state, the phase is approximately locked. Next, it is determined whether the correlation signal CR_Corr is higher than a second threshold TH_2 (step S11). If not, the procedure goes back to the initial state "CR_PreLock=FALSE/CR_Locked=FALSE". If so, the procedure continues. In the next step, it is determined whether a time period T1 has expired (step S12). If not, the procedure goes back to the second state "CR_PreLock=TRUE/CR_Locked=FALSE". If so, a timer counting the time period T1 is re-started and the procedure continues. The flag Video_Got=Video_Got||Video_Sync is constantly checked as the procedure loops around the steps S11 and S12. The flag Video_Got is the product of the logic operation "OR" of the flag Video_Got and video synchronization signal Video_Sync, which checks if the event Video_Sync has risen at least once during the time period T1 (phase precisely locked during time period TI). Following the step S12, it is determined whether the flag Video_Got is TRUE (step S13). If not, the procedure goes back to the initial state "CR_PreLock=FALSE/CR_Locked=FALSE" since no video synchronization has been obtained. If so, video synchronization is determined to have been obtained, and the procedure proceeds to the third state "CR_PreLock=TRUE/CR_Locked=TRUE". However, when entering the third state, the flag Video_Got being TRUE is set back as FALSE since an additional check of the flag is needed. Following the third state, it is determined again whether the time period T1 has expired (step S14). If not, the flag Video_Got=Video_Got||Video_Sync is checked and the procedure goes back to the third state. If so, the procedure goes back to step S13, determining whether the flag Video_Got is TRUE. As stated above, the flag Video_Got is set back as FALSE following the third state, this is because that a user may switch the TV channels, such that a recheck for video synchronization will be required.

Figure 11:
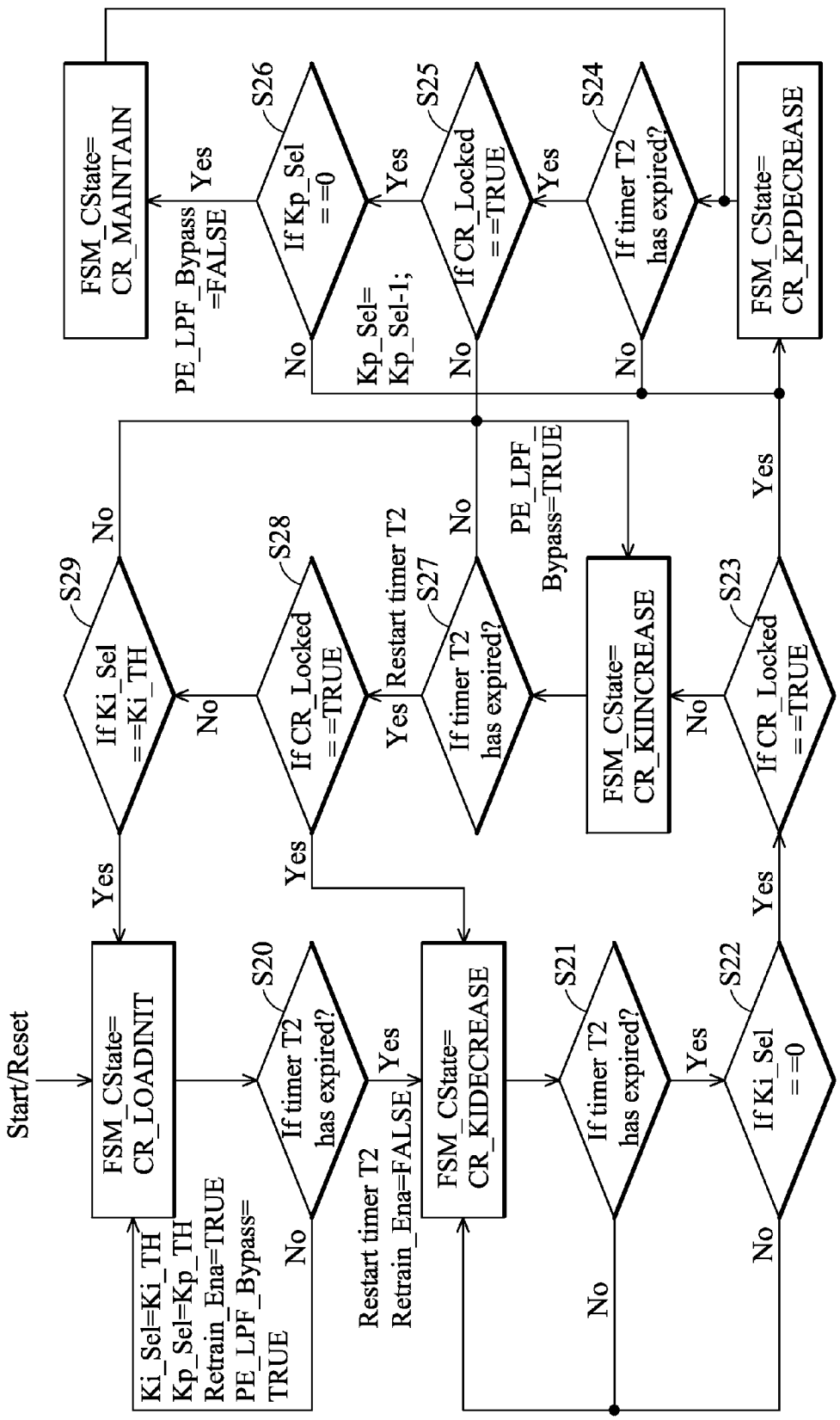
FIG. 11 shows another operation flowchart of the schedule control FSM according to an embodiment of the invention.

FIG. 11 shows another operation flowchart of the schedule control FSM according to an embodiment of the invention. In FIG. 11, five states are involved: an initial state CR_LOADINIT, a Ki_Sel decrease state CR_KIDECREASE, a Ki_Sel increase state CR_KIINCREASE, a Kp_Sel decrease state CR_KPDECREASE, and a stable state CR_MAINTAIN. At the beginning, the system starts with the initial state CR_LOADINIT. In the initial state, the values of Ki_Sel and Kp_Sel are set as Ki_TH and Kp_TH, respectively. In addition, the flags Retrain_Ena and PE_LPF_Bypass are set as TRUE. Then, it is determined whether a time period T2 has expired (step S20). The purpose of not having any operations during the time period T2 is to completely clear the residual data left previously. If the period T2 has not expired, then the procedure goes back to the initial state CR_LOADINIT, to continue to wait for the end of the time period. If the time period T2 has expired, a timer counting the time period T2 is re-started, the flag Retrain_Ena is set as FALSE and the procedure proceeds to the Ki_Sel decrease state CR_KIDECREASE. This state is to decrease the value of the index Ki_Sel, which may be decreased by a minimum value of 0. Following the state, it is determined again whether the timer T2 has expired (step S21). If not, the procedure goes back to the Ki_Sel decrease state CR_KIDECREASE. If so, the timer T2 is restarted and the procedure continues, to determine whether the value of Ki_Sel has achieved the minimum threshold 0 (step S22). If the value of Ki_Sel has not achieved the minimum threshold 0, the procedure goes back the Ki_Sel decrease state CR_KIDECREASE, wherein the value of Ki_Sel is decreased. Meanwhile, it is also determined whether the value of Kp_Sel has achieved the maximum value of Kp_TH. If not, the value of Kp_Sel is increased by 1. In the step S22, if the value of Ki_Sel has achieved the minimum threshold 0, the procedure is then to determine whether the flag CR_Locked is TRUE (step S23). In step S23, if the flag CR_Locked is TRUE, the procedure proceeds to the next state CR_KPDECREASE to decrease the value of Kp_Sel. If the flag CR_Locked is not TRUE, the procedure proceeds to another state CR_KIINCREASE to increase the value of Ki_Sel, wherein the maximum value for Ki_Sel is Ki_TH. In a first case where the state CR_KPDECREASE is met, the value of Kp_Sel is decreased. The Kp_Sel value may be decreased by a minimum threshold 0. Following the state CR_KPDECREASE, it is determined whether the time period T2 has expired (step S24). If not, the procedure goes back to the state CR_KPDECREASE, wherein the value of Kp_Sel is decreased. If so, the timer T2 is restarted again and the procedure continues. In the next step, it is determined again whether the flag CR_Locked is TRUE (step S25). If not, the flag PE_LPF_Bypass is set as TRUE and the procedure proceeds to the state CR_KIINCREASE, which will be described later. If so, the procedure continues. In the next step, it is determined whether the value of Kp_Sel has achieved the minimum threshold 0 (step S26). If not, the procedure goes back to the state CR_KPDECREASE, to decrease the value of Kp_Sel. If so, the procedure proceeds to the final stable state CR_MAINTAIN. Above is the flowchart following the state CR_KPDECREASE, another case following the state CR_KIINCREASE is illustrated below. Following the step S23, wherein the procedure proceeds to the state CR_KIINCREASE, it is next determined whether the time period T2 has expired (step S27). If not, the procedure goes back to the state CR_KIINCREASE, increasing the value of Ki_Sel. If so, the timer T2 is restarted again and the procedure continues. In the next step, it is determined again whether the flag CR_Locked is TRUE (step S28). If so, the procedure proceeds to the state CR_KIDECREASE, decreasing the value of Ki_Sel. If not, the procedure continues. If not, it is determined whether the value of Ki_Sel has achieved the maximum value of Ki_TH (step S29). If not (step S29), the flag PE_LPF_Bypass is set as TRUE and the procedure goes back to the state CR_KIINCREASE, increasing the value of Ki_Sel. Meanwhile, it is also determined whether the value of Kp_Sel has achieved the maximum value of Kp_TH. If not, the value of Kp_Sel is increased by 1. If so (step S29), the procedure goes back to the initial state CR_LOADINIT, wherein the procedure is started from the beginning. Thus, completing description of the invention.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A digital intermediate frequency (IF) demodulator for processing a digital IF signal converted from a radio frequency (RF) signal, comprising:
   an NCO outputting a sine value and a cosine value;
   a down conversion circuit outputting a first zero IF signal comprising a first real part signal and a first imaginary part signal, according to the digital IF signal, the sine value and the cosine value;
   a PIF carrier recovery circuit outputting a loop error signal for the NCO and a second zero IF signal, according to the first zero IF signal and a video synchronization signal; and
   a video baseband demodulator generating a composite video signal according to the second zero IF signal.

2. The digital IF demodulator as claimed in claim 1, further comprising a video signal synchronizer generating the video synchronization signal for the PIF carrier recovery circuit, according to the composite video signal.

3. The digital IF demodulator as claimed in claim 2, wherein the video signal synchronizer is a video decoder.

4. The digital IF demodulator as claimed in claim 2, wherein the video synchronization signal is generated when the synchronization of the composite video signal is confirmed.

5. The digital IF demodulator as claimed in claim 1, wherein the PIF carrier recovery circuit further comprises:
   a correlator outputting a correlation signal according to a received phase shifted signal, wherein the phase shifted signal is generated according to the first real part signal; and
   a schedule control logic circuit determining an state flag to indicate whether the phase of the digital IF signal is locked according to the correlation signal and the video synchronization signal.

6. The digital IF demodulator as claimed in claim 5, wherein the PIF carrier recovery circuit further comprises a loop filter generating the loop error signal according to a phase error signal and a gain setting, the phase error signal is generated according to the received first zero IF signal, and the gain setting is adjusted according to the state flag of the schedule control logic circuit.

7. The digital IF demodulator as claimed in claim 6, wherein the PIF carrier recovery circuit further comprises:
   a first sign extractor acquiring the sign portion of the phase shifted signal;
   a first multiplier multiplying the first imaginary part signal by the acquired sign portion to generate a multiplied signal; and
   a low pass filter outputting the phase error signal by bypassing or low-pass filtering the multiplied signal according to a mode flag outputted by the schedule control logic circuit.

8. The digital IF demodulator as claimed in claim 7, wherein the second zero IF signal comprises a second real part signal and a second imaginary part signal, and the PIF carrier recovery circuit further comprises:
   a second sign extractor acquiring the sign portion of the correlation signal;
   a second multiplier multiplying the first real part signal by the acquired sign portion to generate the second real part signal; and
   a third multiplier multiplying the first imaginary part signal by the acquired sign portion to generate the second imaginary part signal.

9. The digital IF demodulator as claimed in claim 5, wherein the PIF carrier recovery circuit further comprises a low pass filter shifting the phase of the first real part signal radians to generate the phase shifted signal.

10. The digital IF demodulator as claimed in claim 1, further comprising a decimator decreasing the sampling rate of the first zero IF signal before entering into the PIF carrier recovery circuit.

11. The digital IF demodulator as claimed in claim 1, the down conversion circuit further comprising:
   a first multiplier multiplying the digital IF signal by the cosine value to generate the first real part signal; and
   a second multiplier multiplying the digital IF signal by the sine value to generate the first imaginary part signal.

* * * * *